Feb. 21, 1967   J. L. REHMAN   3,305,427
TIRE BUILDING APPARATUS AND METHOD
Filed July 19, 1963   5 Sheets-Sheet 1

INVENTOR.
JOHN L. REHMAN
BY Teare, Fetzer & Teare
ATTORNEYS

INVENTOR.
JOHN L. REHMAN
BY Teare, Fetzer & Teare
ATTORNEYS 3,305,427
TIRE BUILDING APPARATUS AND METHOD
John L. Rehman, Barberton, Ohio, assignor to The Akron Standard Mold Company, Akron, Ohio, a corporation of Ohio
Filed July 19, 1963, Ser. No. 296,307
10 Claims. (Cl. 156—401)

This invention relates to a method and apparatus for building vehicle tires and more particularly to a method and apparatus for turning and/or stitching rubberized fabric ply material around inextensible bead portions incorporated therewith for building vehicles tires.

In conventional tire building, a plurality of rubberized fabric plies are wound onto a rotating drum type apparatus. A pair of circular bead rings are then placed over the plies adjacent the marginal edges of the drum, whereupon, the edges of the plies are then turned up around the bead rings and stitched into place. The tire tread and chafing strips may then be applied to the fabric plies to form the completed tire carcass which then may be removed from the rotatable drum and vulcanized in a normal manner to provide a vehicle tire.

The incorporation of the inextensible bead rings with the fabric plies provides several important functions, especially when fabricating heavy duty tires, such as those for trucks, buses and the like. The inextensible bead rings act to firmly secure the tire to the peripheral surface of the rim upon which the tire is to be applied and acts to exert a retaining pressure on the several fabric plies to prevent separation thereof, when the tire is in use. Moreover, the inextensible bead rings must be precisely positioned on the fabric plies and anchored in place, such that the fabric plies may be smoothly and uniformly turned up over the bead rings and stitched into retaining relationship therewith. Accordingly, if any sleaziness or wrinkling of the fabric material occurs when incorporating the bead rings with the fabric plies, there results a condition wherein the bead rings tend to move or shift out of alignment during subsequent vulcanization or during subsequent usage of the tire, thereby causing a hazardous condition when applied to a vehicle. Additionally, the presence of sleaziness or wrinkles in any fabric ply after vulcanization, results in weakening of the fibers comprising the plies, thereby causing premature failure of the tire in normal usage.

In the copending United States patent application of Stephen R. Sabo and John L. Rehman Serial No. 213,498, filed July 30, 1962, now U.S. Patent 3,244,575, issued April 5, 1966, there is disclosed a rotatable drum type tire building apparatus for turning and stitching the fabric plies about inextensible bead portions incorporated therewith for building vehicle tires. The present invention broadly described provides a tire building apparatus wherein the position of the diaphragm displacement means with respect to the tire building drum in a horizontal direction may be selectively changed, and as illustrated, the machine is of the same general type aforedescribed in connection with said patent application, Serial No. 213,498, but with an improved means providing for angular movement of the structure which supports the displacement wheels, so that such displacement wheels may be rotated preferably 45° about a vertical axis, and with respect to the longitudinal axis of the tire building drum. Such improved means is effective for progressively deforming the inflated diaphragms in axially opposite directions to turn the marginal edges of the fabric plies around the inextensible bead portion supported on the drum, thereby materially increasing the usability and adaptability of the apparatus for building vehicle tires.

A principal object of the present invention is to provide an improved method and apparatus for turning the marginal edges of fabric ply material around inextensible bead portions incorporated therewith.

Another object of the present invention is to provide an improved method and apparatus for the fabrication of vehicle tires and the like which is of a relatively simple and durable construction and which economically provides a tire having uniform structural characteristics.

A further object of the present invention is to provide a tire building apparatus of the aforementioned type which includes expansible diaphragm means, an improved diaphragm displacement means, and means for providing selective angular orientation of such displacement means in a horizontal direction with respect to the longitudinal axis of the tire building drum.

Another object of the present invention is to provide a tire building apparatus of the aforementioned type having a pair of spaced expansible diaphragms of relatively thin and substantially uniform wall thickness, an improved diaphragm displacement means including a pair of spaced annular displacement wheels, and with the displacement means being mounted on the tire building apparatus for rotation in a generally horizontal plane, so that the displacement wheels can be disposed at any selected angular relationship with respect to the longitudinal axis of the drum, resulting in progressive displacement of the inflated diaphragms in axially opposite directions upon pressure applying engagement by the displacement wheels, thereby automatically and uniformly turning the marginal edges of the fabric plies around the inextensible bead portions without wrinkling or distortion thereof.

Other objects and advantages of the present invention will be apparent from the following description taken in conjunction with the accompanying drawings, wherein.

Figure 1:
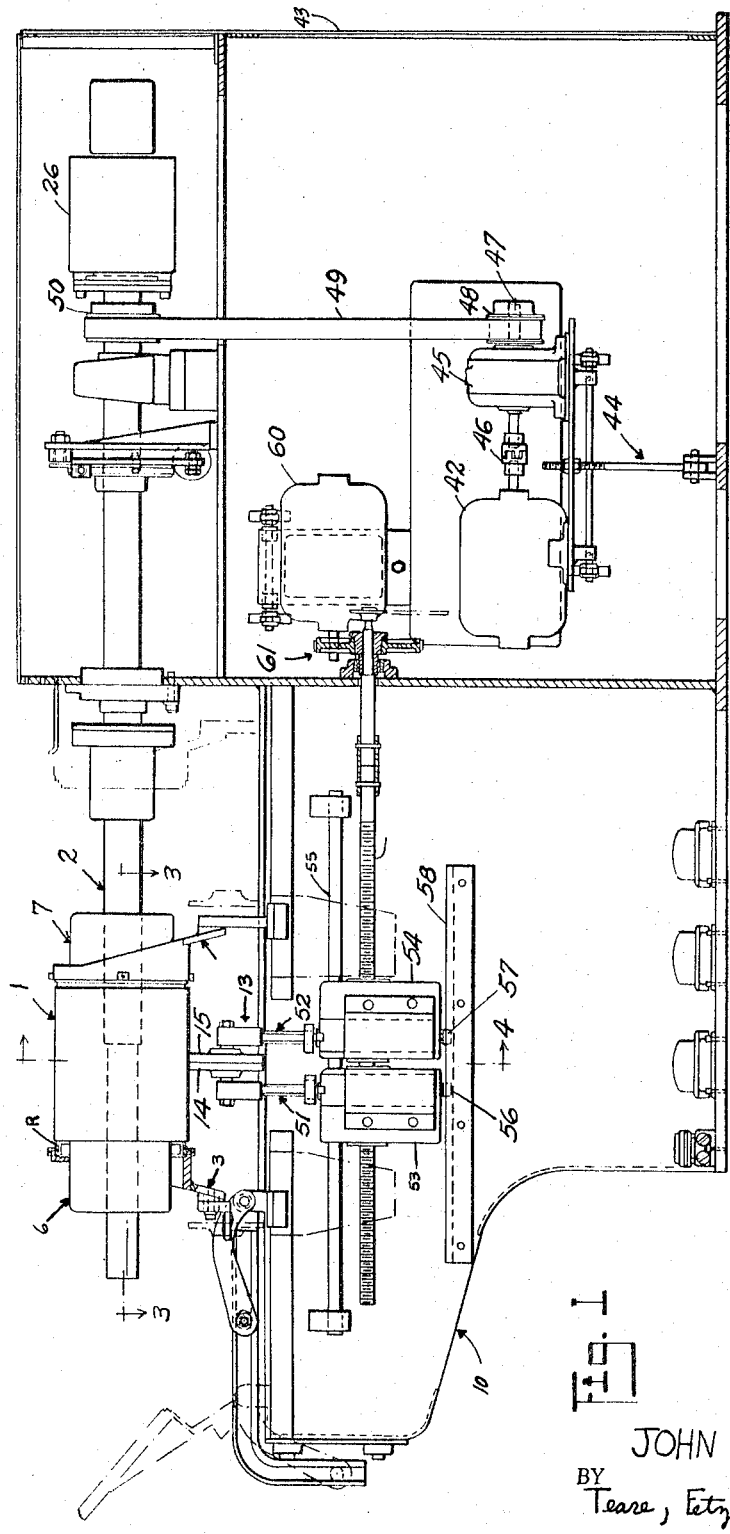
FIG. 1 is an elevational view, with parts broken away, of the novel tire building apparatus of the present invention.
Figure 2:
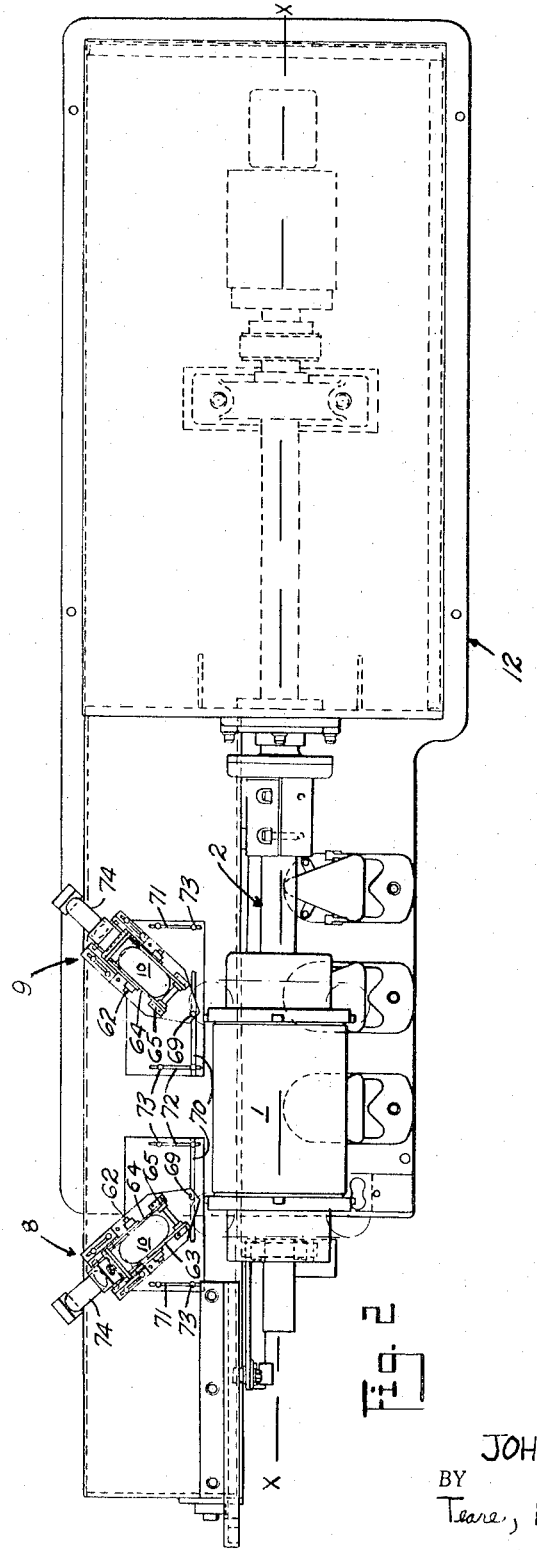
FIG. 2 is a top plan view, with parts removed, of the tire building apparatus of the present invention, and showing the improved diaphragm displacement means mounted on the tire building housing and rearwardly of the rotatable drum.
Figure 3:
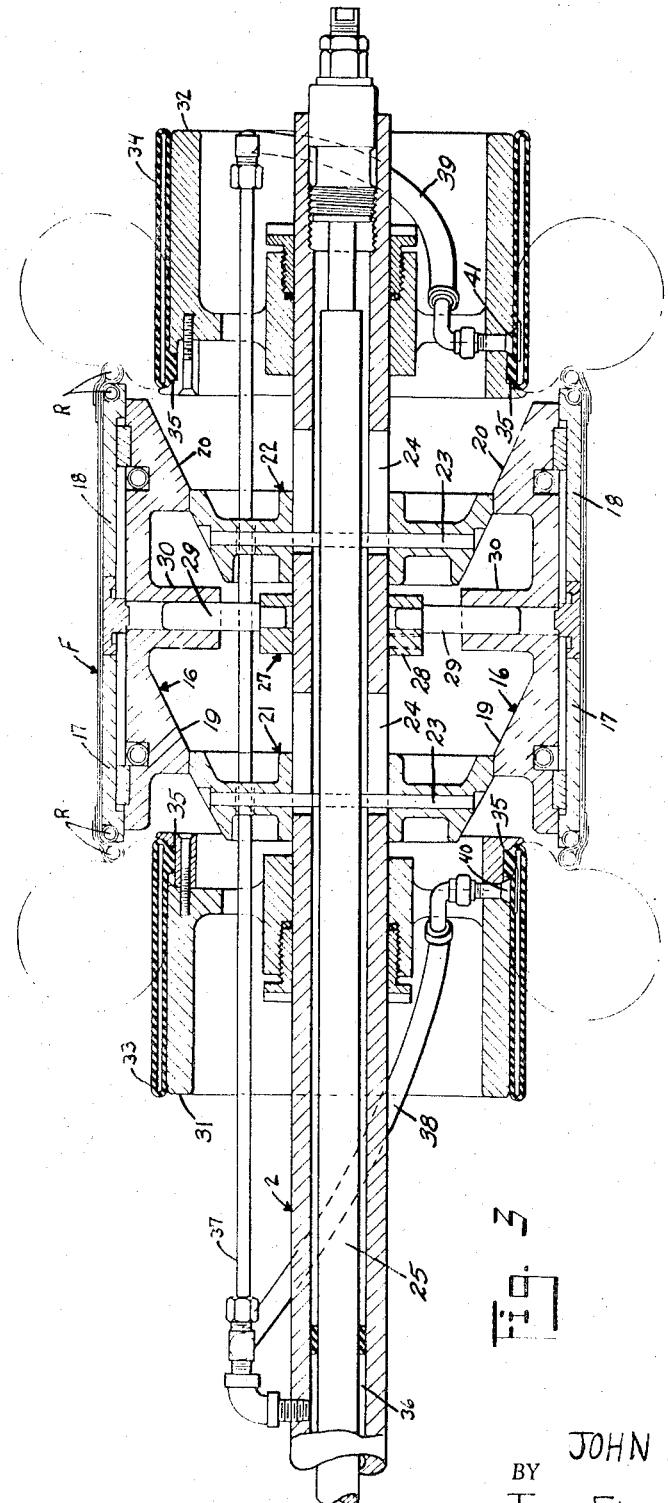
FIG. 3 is an enlarged cross-sectional view taken along the line 3—3 of FIG. 1, and showing the rotatable drum and expansible diaphragm means adjacent the ends thereof and removed from the tire building assembly.

Generally, referring now again to the drawings, and in particular to FIGS. 1 to 3 thereof, there is illustrated a tire building apparatus embodying the present invention. Such apparatus broadly comprises an expandable drum 1 rotatably mounted on a power quill 2 and adapted to support a plurality of rubberized fabric plies F thereon. A pair of bead setting units 3 and 4 are illustrated as concentrically disposed relative to the ends of the drum 1 for axial movement toward and away from one another for positioning a pair of inextensible bead rings R (FIG. 3) over the marginal edges of the fabric plies F supported on the drum.

The power quill 2 is shown mounting a pair of concentrically disposed expansible diaphragm units 6 and 7. The diaphragm units 6 and 7 are supported adjacent each end of the drum for turning the lateral marginal edges of the fabric plies F around the inextensible bead rings R.

Figure 4:
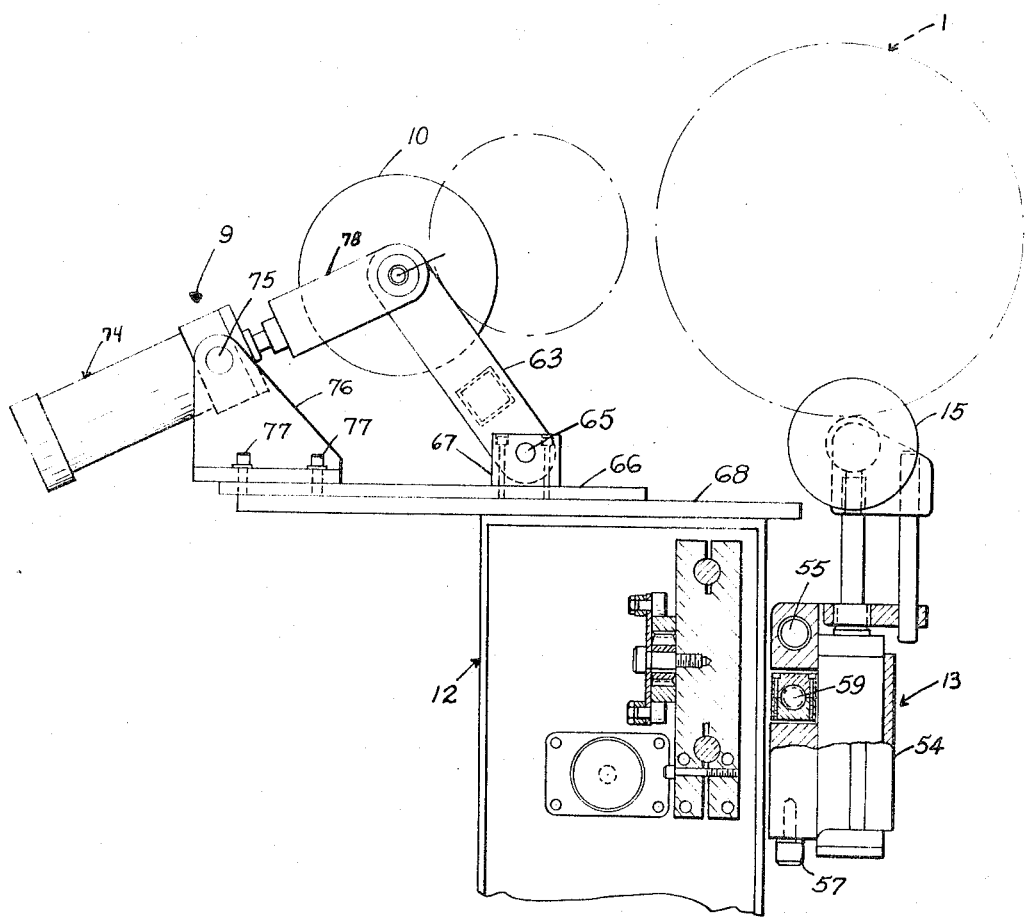
FIG. 4 is an enlarged cross-sectional view taken along the line 4—4 of FIG. 1, and showing one of the improved diaphragm displacement means of the present invention mounted on the tire building housing for selective angular movement relative to the longitudinal axis of the drum.

In the instant invention and as best viewed in FIGS. 2 and 4, a pair of diaphragm displacement or deforming units 8 and 9, each including a generally torus-shaped displacement wheel 10, may be mounted rearwardly and in a selective angular relationship relative to the longitudinal axis of the drum 1 on the housing 12. The displacement wheels 10 are pivotally mounted on the respective displacements units 8 and 9 for pressure applying, displacing engagement against the respective expansible diaphragm units 6, 7, to thereby complete, in a predetermined manner, turning of the lateral marginal edges of the fabric plies around the associated bead rings R.

As shown in FIG. 1, a stitcher mechanism 13, including a pair of oppositely disposed stitcher wheels 14, 15, may be disposed beneath and forwardly of the drum on the housing 12. The stitcher wheels 14, 15 may be mounted for vertical movement into and out of stitching relation with the fabric plies F supported on the drum, and are axially movable toward and away from one another to complete stitching of the fabric plies after termination of the ply turnover operation, as aforesaid.

More specifically, there is illustrated in FIGS. 1 and 3 of the drawings, the expandable drum 1, bead setting units 3, 4, expansible diaphragm units 6, 7, and underneath stitcher mechanism 13 of the same general type aforedescribed in connection with the said patent application, Serial No. 213,498. Accordingly, as shown in FIG. 3 of the drawings, the periphery of the drum may include a plurality of annular segment supporting members 16, each of which is adapted to slidably receive, for widthwise adjustment thereon, a pair of arcuate wing members 17, 18. Each of the respective segment supporting members 16 may be provided with a pair of radially inwardly extending cam followers 19, 20, which are adapted for relative camming coaction with complementary cam surfaces provided on a pair of cone type cam members 21, 22.

The respective cone type cam members 21, 22 may be mounted for axial movement relative to the quill 2 by means of roll pins 23 which extend longitudinally through slots 24 in the quill 2. The roll pins 23 may in turn be fixedly secured intermediate their ends to an axially extending collapsing rod 25. The rod 25 may be reciprocably mounted within the hollow quill 2 by means of a fluid pressure motor 26 mounted within the housing 12. Moreover, reciprocation of the collapsing rod 25 upon actuation of the motor 26, imparts axial movement to the cone type cam members 21, 22 which causes radial collapsing and expanding of the drum segments 17, 18 upon camming engagement with the associated cam followers 19, 20.

To guide and maintain precision radial movement during such collapsing and expanding of the drum segments, a telescoping guide mechanism designated at 27 may be provided. The guide mechanism 27 includes an annular hub 28 which is fixedly secured to the quill 2 and is provided with a plurality of radially extending guides 29 which are slidably received in corresponding bearing sleeves 30 that project radially inwardly from each of the associated segment supporting members 16.

The expansible diaphragm units 6 and 7 generally include a pair of cylindrical spiders 31, 32 disposed adjacent the ends of the drum 1. An annular elastic, expansible diaphragm 33, 34 is preferably supported on each of the respective spiders 31, 32 and is fixedly secured thereto adjacent one marginal edge by means of a suitable adhesive, shown generally at 35. The respective diaphragms may be comprised of any suitable elastic material, such as plastic, rubber, synthetic rubber, or rubberized fabric ply material, which is substantially impervious to the passage of air and which is sufficiently elastic to provide controlled expansion and contraction thereof. In the expanded condition, the diaphragms have an axial length sufficient to uniformly turn the lateral edges of the fabric plies F around the inextensible bead rings R, as shown by broken lines in FIG. 3.

To inflate the respective diaphragms, fluid under pressure may be admitted to the space 36 between the collapsing rod 25 and the quill 2 from a suitable pressure source (not shown). Moreover, fluid pressure so admitted is introduced through a pressure supply manifold 37 which is provided at one end with a flexible conduit 38 which communicates with one of the diaphragms 33 and which communicates with the other diaphragm 34 by means of a second flexible conduit 39. The conduits may be provided with flared, pipe couplings 40, 41 which communicate in tight-fitting relation interiorly of the respective diaphragms 33, 34. By such an arrangement, fluid under pressure may be effectively introduced into the system to expand the diaghragms during a portion of the tire building cycle. The diaphragms may then be quickly collapsed by reversing the operation to draw a vacuum on the system.

Rotational movement may be imparted to the drum 1 by means of a suitable electric motor 42 disposed within a compartment 43 of the housing 12 on an adjustable support 44. As shown, the motor drive incorporates a speed reducer 45 coupled thereto, as at 46, the output shaft 47 of which mounts a drive pulley 48. The drive pulley mounts a drive belt 49 which in turn is trained over a second driven pulley 50 fixedly secured adjacent one end of the quill 2.

The underneath stitcher mechanism 13 includes the aforementioned pair of stitcher wheels 14, 15 which are mounted for vertical movement relative to the drum 1 by means of fluid piston and cylinder units 51, 52, as best shown in FIGS. 1 and 4. The fluid piston and cylinder units 51, 52 may be supported by a pair of axially movable carriage members 53, 54 which are slidably mounted on a horizontally extending guide rod 55 which in turn is fixedly secured to the housing 12. The carriages adjacent their lower ends may be provided with guide rollers 56, 57 which are adapted for relative sliding engagement on a guide bracket 58 secured to the housing 12.

To impart relative axial movement to the stitcher wheels 14, 15 toward and away from one another, an oppositely threaded drive screw 59 may be provided to extend through and threadedly engage the respective carriage members 53, 54. Rotation of the drive screw may be provided from a second electric motor 60 and another pulley drive arrangement 61 disposed within the compartment 43. Rotation of the drive screw 59 in one direction, therefore, serves to move the carriage members 53, 54 mounting the stitcher wheels 14, 15 axially toward one another while movement in the opposite direction serves to move them axially apart.

As best shown in FIGS. 2 and 4 of the drawings, the present invention embodies an improved, angularly disposable, diaphragm displacement means for effectively deforming the inflated, elastic, diaphragms 33, 34, thereby turning, in a predetermined manner, the marginal edges of the fabric plies F around the bead rings R. Such turning of the fabric plies F may be accomplished by means of a pair of displacement units designated generally at 8, 9, spaced rearwardly from and generally diagonally relative to the longitudinal axis X—X (FIG. 2) of the drum 1. In the preferred form, each displacement unit is of a generally identical construction and includes a smooth, generally torus shaped, displacement wheel 10 comprised of a suitable material, such as rubber, plastic, metal or the like, journaled for free rotation on a stub shaft 62 which extends between the free ends of a pair of oppositely disposed toggle arms 63, 64 (FIG. 4).

The toggle arms 63, 64 may be pivotally secured as at 65 adjacent their other ends to a base plate 66 by means of spaced bearing lugs 67. The base plate 66 is adapted for angular adjustment on a bracket plate 68 by means of a threaded nut and bolt assembly 69 which is slidably received in an axially extending slot 70 provided in the bracket plate 68. Moreover, by simple adjustment of the nut and bolt assembly 69, the angular orientation, in a horizontal plane, of the base plate 66 mounting the displacement wheel 10 relative to the longitudinal axis X—X of the drum may be readily achieved. Similarly, radial movement of the entire displacement unit toward and away from the longitudinal axis X—X of the drum 1 may be accomplished by a pair of radially extending, parallel slots 71, 72, spaced apart adjacent opposed marginal edges of the bracket plate 68 and which are adapted to slidably receive therethrough corresponding adjustable nut and bolt assemblies 73. The nut and bolt assemblies 73 serve to engageably clamp the bracket plate 68 at predetermined selected points radially of the drum 1. Moreover, by such juxtaposed plate arrangement, the exact angular orientation of the displacement wheels 10 may be achieved for progressively displacing the inflated diaphragms 33, 34 in axially opposite directions, as will hereinafter be more fully described.

Pivotal movement of the respective displacement wheels 10 from their preferred angularly oriented position against the corresponding inflated diaphragm is preferably accomplished by means of a fluid piston and cylinder unit 74 mounted on each of the respective displacement units 8, 9. As shown in FIG. 4, each piston and cylinder unit 74 is pivotally secured adjacent one end, as at 75, within a generally U-shaped bracket 76 which is adjustably mounted adjacent the rear end of the base plate 66 by suitable attachment means, such as bolts 77. The other end of the piston and cylinder unit 74 may be pivotally secured to the respective toggle arms 63, 64 by means of a generally U-shaped toggle bracket 78 which is journaled on the aforesaid stub shaft 62. Moreover, upon actuation of the respective cylinder unit 74, the smooth, annular displacement wheel 10 is pivoted radially inwardly in a clockwise direction (FIG. 4) and into predetermined pressure-applying engagement against the corresponding inflated diaphragm. Each of the respective cylinder units 74 may be actuated independently or simultaneously from a common source of fluid pressure (not shown), such that the fabric plies are uniformly turned and stitched into place around the inextensible bead rings R adjacent the ends of the drum 1.

Figure 5:
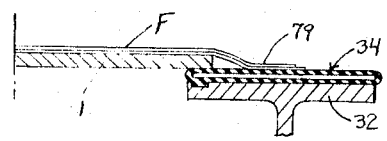
FIGS. 5–10 show diagrammatically the relative sequential operations on the rotatable drum, including radial expansion of the drum, setting of the inextensible bead portions, inflation of the expansible diaphragms, and angular displacement of the inflated diaphragms for turning the fabric plies around the inextensible bead portions in accordance with the principles of the present invention.
Figure 6:
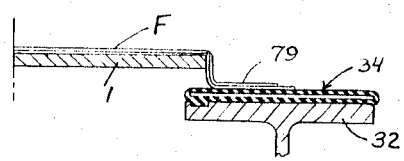
Figure 7:
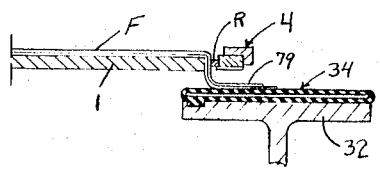

In utilizing the tire building apparatus and the improved diaphragm displacement means of the present invention, a plurality of fabric plies F comprising the tire carcass may be sequentially applied (FIG. 5) to the drum from a conventional ply servicer (not shown). The drum 1 may then be radially expanded to provide a tire carcass of the predetermined diameter (FIG. 6). Bead setting units 3, 4 may then be axially moved from their inoperative position (broken line FIG. 1) to place a pair of inextensible bead rings R on the fabric plies F adjacent the ends of the drum (FIG. 7).

Figure 8:
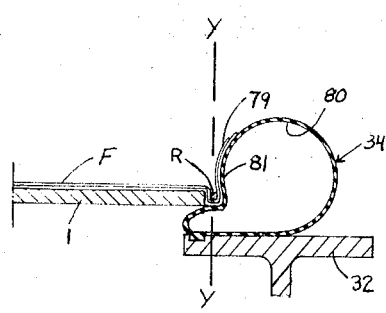

The bead rings R having been set, the bead setting units 3, 4 may then be withdrawn so that the marginal edges 79 of the fabric plies F remain supported on the deflated diaphragms. To commence the ply turn-up, fluid under pressure is admitted to inflate diaphragms 33, 34 via supply manifold 37, and to a pressure of about 10 p.s.i. to 20 p.s.i. which is sufficient to inflate the diaphragms. Since the elastic material comprising the confining wall 80 of the respective diaphragms is of a substantially uniform thickness and flexibility, initial inflation thereof causes the diaphragm to be expanded radially outwardly into a generally circular configuration in vertical cross section (FIG. 8). This substantially symmetric inflation of the respective diaphragms automatically turns the marginal edges 79 of the fabric plies F up through an angle of about 90° around the bead rings R into a generally vertical position, indicated by the broken line Y—Y, relative to the longitudinal axis X—X of the drum (FIG. 8). Such initial inflation exerts an axial pulling tension on the cords of the fabric plies F and in the turned-up position a portion 81 of the ply material is brought to axially overlie the upper exposed surface of the bead ring R throughout its entire circumference. This overlying relation between the ring R and the ply material 81 effectively maintains the axial tension on the material during the initial turn-up, thereby preventing shifting or misalignment of the bead ring R and prevents wrinkling and air pocket formation in the tire carcass.

Figure 9:
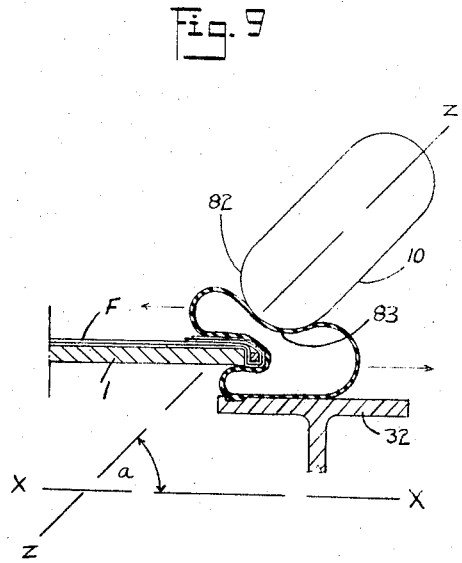
Figure 10:
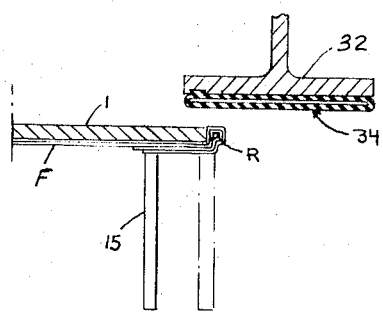

Upon termination of the initial turn-up, the fluid piston and cylinder units 74 are actuated to move the displacement wheels 10 angularly inwardly toward the center of the drum. With the diaphragm displacement units angularly oriented, such that the longitudinal center line Z—Z through the displacement wheels is at an angle alpha ($\alpha$) of about 45° relative to the longitudinal axis X—X of the drum (FIG. 9), continued actuation of the respective piston and cylinder units 74 brings the convexly extending outer surface 82 of the wheel 10 into deforming engagement against the outer surface and at a point 83 substantially adjacent the midpoint of the diaphragm. This angularly inwardly movement of the displacement wheel 10 uniformly spreads the diaphragm in axial opposite direction, as shown by the arrows, into a generally oblate configuration in vertical cross section. Such oppositely directed axial displacement of the diaphragm turns the marginal edges of the ply material from its vertically oriented position (FIG. 8) down around the bead rings R and into engagement against the confronting upper surface of the tire carcass.

Such axial "spreading," as opposed to "rolling over" of the expansible diaphragms, substantially reduces the stress and strain forces on the connection (adhesive securement 35) of the respective diaphragms 33, 34 to the supporting spiders 31, 32, thereby preventing weakening of the diaphragm material and accidental dislodgement of the diaphragm during high rotational speeds of the tire building drum. In addition to substantially increasing the useful cycle life of the diaphragm, such an arrangement provides the use of expansible diaphragms having thin, substantial uniform wall thickness which results in greatly enhanced precision and control in turning the fabric ply material around the bead portions. Such uniform wall thickness enables the diaphragm to flow axially following the exact contour presented by the shoulder of the drum and the bead ring, thereby resulting in a uniform, wrinkle-free compaction of the fabric plies.

Upon completion of the turn-up and turn-down operations, the displacing units 8, 9 are withdrawn and the underneath stitcher wheels 14, 15 are vertically elevated into position adjacent the ends of the drum. The stitcher wheels 14, 15 may then be moved simultaneously toward one another and toward the center of the drum 1 to complete any further stitching of the fabric plies F against the tire carcass. Having completed the stitching operation, the stitcher wheels may then be withdrawn, whereupon, the drum 1 may be radially collapsed, the tire carcass removed, and vulcanized in accordance with conventional tire building practice.

In the above described tire building apparatus, certain operations performed thereon are controlled automatically by movement of the assembled parts, others by actuation of various push buttons, timers, limit switches, and the like, which may be readily provided by those skilled in the art, such as those shown diagrammatically in the aforementioned patent application Serial No. 213,498. Therefore, the selection of any type of electro-mechanical control system is within the realm of those skilled in the art for accomplishing the proper sequential operation of the apparatus and is not herein presented as part of the present invention.

I have shown and described what I consider to be the preferred embodiment of my invention, together with suggested forms, and it will be obvious to those skilled in the art that other changes may be made without departing

I claim:

1. In a tire building apparatus comprising, a frame, an expandable drum mounted for rotation on said frame and adapted to support a plurality of fabric plies having inextensible bead portions thereon, expansible diaphragm means disposed adjacent at least one end of said drum, motive means for rotation of said drum and said expansible diaphragm means, diaphragm displacement means adjustably mounted on said frame for movement in a plane disposed at an angle to the longitudinal central axis of said drum, adjustment means for selectively varying the said angle of the plane in which said diaphragm displacement means is adapted for movement, and pressure means for selectively moving said diaphragm displacement means toward said drum and into engagement with said expansible diaphragm means whereby said diaphragm displacement means progressively alters the shape of said expansible diaphragm means in opposite directions generally parallel to the longitudinal central axis of said drum as said expansible diaphragm means rotates relative to and in coacting engagement with said diaphragm displacement means so as to progressively turn the marginal edges of said fabric plies around said inextensible bead portions.

2. A tire building apparatus in accordance with claim 1, wherein said expansible diaphragm means includes a cylindrical spider disposed concentrically adjacent each end of said drum, each of said spiders supporting thereon an elastic, generally air-impervious diaphragm adapted to be inflated from a source of fluid pressure.

3. A tire building apparatus in accordance with claim 1, wherein said diaphragm displacement means includes a support means mounted on said frame adjacent at least one end of said drum, said support means being adjustably mounted on said frame for selective positioning for varying through a range of selective acute angles the said angle of the plane in which said diaphragm displacement means is adapted for movement relative to said drum, and an annular pressure applying wheel pivotally mounted on said support means for pivotal movement toward and away from said drum upon actuation of said pressure means.

4. A tire building apparatus in accordance with claim 3, wherein said support means includes a first plate having slotted portions therein, fastener means coactingly received through selective of said slotted portions for adjustably locating said plate in a radial direction on said frame relative to said drum, a second plate juxtaposed on said first plate, and fastener means on said second plate and coactingly received through selective of the slotted portions in said first plate for adjustably locating said second plate in an axial direction relative to said drum.

5. A tire building apparatus in accordance with claim 3, wherein said pressure means includes a fluid cylinder and piston unit pivotally secured at one end to said support means and at its other end to said annular wheel for selectively pivoting the latter into and out of engagement against said expansible means.

6. In a tire building apparatus comprising, a frame, an expandable drum mounted for rotation on said frame and adapted to support a plurality of fabric plies having inextensible bead portions thereon, expansible diaphragm means disposed adjacent at least one end of said drum, motive means for rotation of said drum and said expansible diaphragm means, diaphragm displacement means supported on said frame for movement in a plane disposed at an acute angle to the longitudinal central axis of said drum and pressure means for selectively moving said diaphragm displacement means toward said drum and into engagement with said expansible diaphragm means, whereby said diaphragm displacement means progressively alters the shape of said expansible means in opposite directions generally parallel to the longitudinal central axis of said drum as said expansible diaphragm means rotates relative to and in coacting engagement with said diaphragm displacement means so as to progressively turn the marginal edges of said fabric plies around at least one of said inextensible bead portions.

7. A tire building apparatus in accordance with claim 6, wherein said expansible diaphragm means includes a pair of cylindrical spider members concentrically disposed and spaced axially apart adjacent each end of said drum, each of said spider members supporting an elastic, generally air-impervious diaphragm extending around the periphery thereof and adapted to be inflated from a source of fluid pressure.

8. A tire building apparatus in accordance with claim 7, wherein each of said diaphragms is secured to the respective one of said spider members around its periphery adjacent the shoulder of said drum, said diaphragms being of a substantially uniform wall thickness so as to be inflated into a generally circular configuration in vertical cross section from said source of fluid pressure.

9. A tire building apparatus in accordance with claim 6, wherein said diaphragm displacement means includes a pair of annular pressure applying wheels, adjustable means for selectively varying the said acute angle of the plane in which said diaphragm displacement means is adapted for movement, one of said wheels being pivotally mounted on one of said adjustable means and the other of said wheels being pivotally mounted on the other of said adjustable means adjacent the ends of said drum for selective angular displacing engagement against said diaphragm upon actuation of said fluid pressure means.

10. A tire building apparatus in accordance with claim 6 wherein said acute angle is about 45°.

References Cited by the Examiner
UNITED STATES PATENTS

| | | | |
|---|---|---|---|
| 2,369,998 | 2/1945 | Bateman | 156—408 |
| 3,044,533 | 7/1962 | Lowe | 156—401 |
| 3,063,491 | 11/1962 | Mitchell | 156—410 |
| 3,078,204 | 2/1963 | Appleby | 156—401 X |
| 3,171,769 | 3/1965 | Henley et al. | 156—403 X |
| 3,188,260 | 6/1965 | Nebout | 156—416 X |

EARL M. BERGERT, *Primary Examiner.*

CLIFTON B. COSBY, *Examiner.*